US009429224B2

(12) United States Patent
Wiens et al.

(10) Patent No.: US 9,429,224 B2
(45) Date of Patent: Aug. 30, 2016

(54) GEARBOX LUBRICATION SYSTEM

(71) Applicant: Deere & Company, Moline, IL (US)

(72) Inventors: Scott R. Wiens, Cedar Falls, IA (US); Eric T. Lammers, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 174 days.

(21) Appl. No.: 14/181,765

(22) Filed: Feb. 17, 2014

(65) Prior Publication Data
US 2015/0233464 A1    Aug. 20, 2015

(51) Int. Cl.
*F16H 57/04* (2010.01)
*F16C 33/66* (2006.01)

(52) U.S. Cl.
CPC ....... *F16H 57/0428* (2013.01); *F16C 33/6666* (2013.01); *F16H 57/043* (2013.01); *F16H 57/0409* (2013.01); *F16H 57/0471* (2013.01)

(58) Field of Classification Search
CPC ........... F16H 57/0426; F16H 57/0427; F16H 57/0428; F16H 57/043; F16H 57/0431; F16H 57/0471; F16C 33/6666
See application file for complete search history.

(56) References Cited

U.S. PATENT DOCUMENTS

| | | | | | |
|---|---|---|---|---|---|
| 2,247,732 | A | * | 7/1941 | Paton | F16H 57/0471 184/6.12 |
| 2,487,350 | A | * | 11/1949 | Markland | F16H 57/0427 184/11.1 |
| 2,489,699 | A | | 11/1949 | Clark | |
| 2,590,870 | A | | 4/1952 | Keese | |
| 2,797,771 | A | * | 7/1957 | Orr | F16C 33/6659 184/11.1 |
| 3,223,196 | A | * | 12/1965 | Stott | F16C 33/6659 184/31 |
| 3,637,049 | A | * | 1/1972 | Butterfield | F16H 57/043 184/6.12 |
| 3,848,691 | A | * | 11/1974 | Dolan | B60K 17/3467 180/250 |
| 4,221,279 | A | * | 9/1980 | Jones | F16C 33/6659 184/11.1 |
| 4,317,386 | A | * | 3/1982 | Ida | F16H 3/08 184/11.1 |
| 4,327,598 | A | * | 5/1982 | Yoneda | F16H 3/08 184/11.1 |
| 4,359,142 | A | * | 11/1982 | Schultz | F16C 19/56 184/11.1 |
| 4,442,729 | A | * | 4/1984 | Hayakawa | B60K 17/344 184/6.12 |
| 4,616,526 | A | * | 10/1986 | Morisawa | B60K 17/344 74/606 R |
| 4,766,773 | A | * | 8/1988 | Yamaguchi | F16H 3/0915 184/6.12 |
| 4,776,237 | A | * | 10/1988 | Premiski | F16C 21/00 384/420 |

(Continued)

FOREIGN PATENT DOCUMENTS

| | | |
|---|---|---|
| DE | 3004117 A1 | 8/1980 |
| JP | 2004190752 | 7/2004 |
| KR | 20-2010-0007299 U | 7/2010 |

OTHER PUBLICATIONS

John Deere, 7R PTO shaft (1 page), date unknown—(image of parts in production before the invention of this invention).
German Search Report issued in counterpart application No. 102015202416A dated Oct. 19, 2015 (9 pages).

*Primary Examiner* — Minh Truong

(57) ABSTRACT

A high speed gearbox includes a housing which encloses a rotating gear and a volume which contains oil and air. The gear has an outer first surface exposed to the volume and has a second surface exposed to the environment. A vent arrangement includes first and second passages formed in the gear. The second passage extends axially part way into the gear and has an outer end exposed to the second surface. The first passage extends radially from the first surface to the second passage. A check valve is mounted in the second passage and permits one-way flow of air from the volume to the environment.

8 Claims, 4 Drawing Sheets

(56) References Cited

U.S. PATENT DOCUMENTS 4,842,100 A * 6/1989 Cameron ................ F16C 19/55
                                                184/11.2
5,810,116 A * 9/1998 Kaptrosky .......... F16C 33/6659
                                                184/11.1
6,875,111 B1 * 4/2005 Rowell ................. F16H 57/043
                                                415/120

* cited by examiner

US 9,429,224 B2

GEARBOX LUBRICATION SYSTEM

FIELD

The present disclosure relates to a lubrication system for a gearbox.

BACKGROUND

Vehicle transmissions, such as power take off (PTO) transmissions, have shafts and gears which rotate in a housing which forms an oil sump so that the parts are adequately coated with lubricating oil while they rotate. Certain PTO transmissions have a pressurized lube system wherein sump oil level which is above the center of a shaft, and radial passages in the shaft pull oil through the shaft. Shaft and gear rotation causes the sump oil to be thrown away from the center of the transmission.

Lube fluid for a transmission can also be diverted from a tractor hydraulic system. But, this requires balancing lube systems, returning and controlling sump oil levels, and mixing oil with a gear box that is coupled to an implement, such as a planter. A transmission lubrication system can also include a small lube pump. However, this increases costs due to the additional parts, such as screens, lines and cooling requirements.

In a known small gear box, a needle bearing is sandwiched between two gears which rotate at lower and higher speeds, respectively. The gear box does not have any pressurized lube system or lube pump and will only use sump oil splash for cooling and lubrication. Due to the rotation of the gears, centripetal force will push sump oil away from the needle bearing and an adjacent ball bearing. It is desired to have a system which delivers lubrication oil to the bearings while working against the centrifugal force created by the rotating gears.

SUMMARY

According to an aspect of the present disclosure, a gearbox has a housing which encloses a rotating gear and a volume which contains oil and pressurized air. The gear has a first surface exposed to the volume and a second surface exposed to the environment. A vent arrangement includes first and second passages formed in the gear. The second passage extends part way into the gear and has an outer end exposed to the second surface. The first passage extends radially outwardly from the second passage to the first surface. The second passage extends axially along a central axis of the gear. A check valve is mounted in the second passage and permits one-way flow of air from the volume to the environment.

DETAILED DESCRIPTION OF THE DRAWINGS

Figure 1:
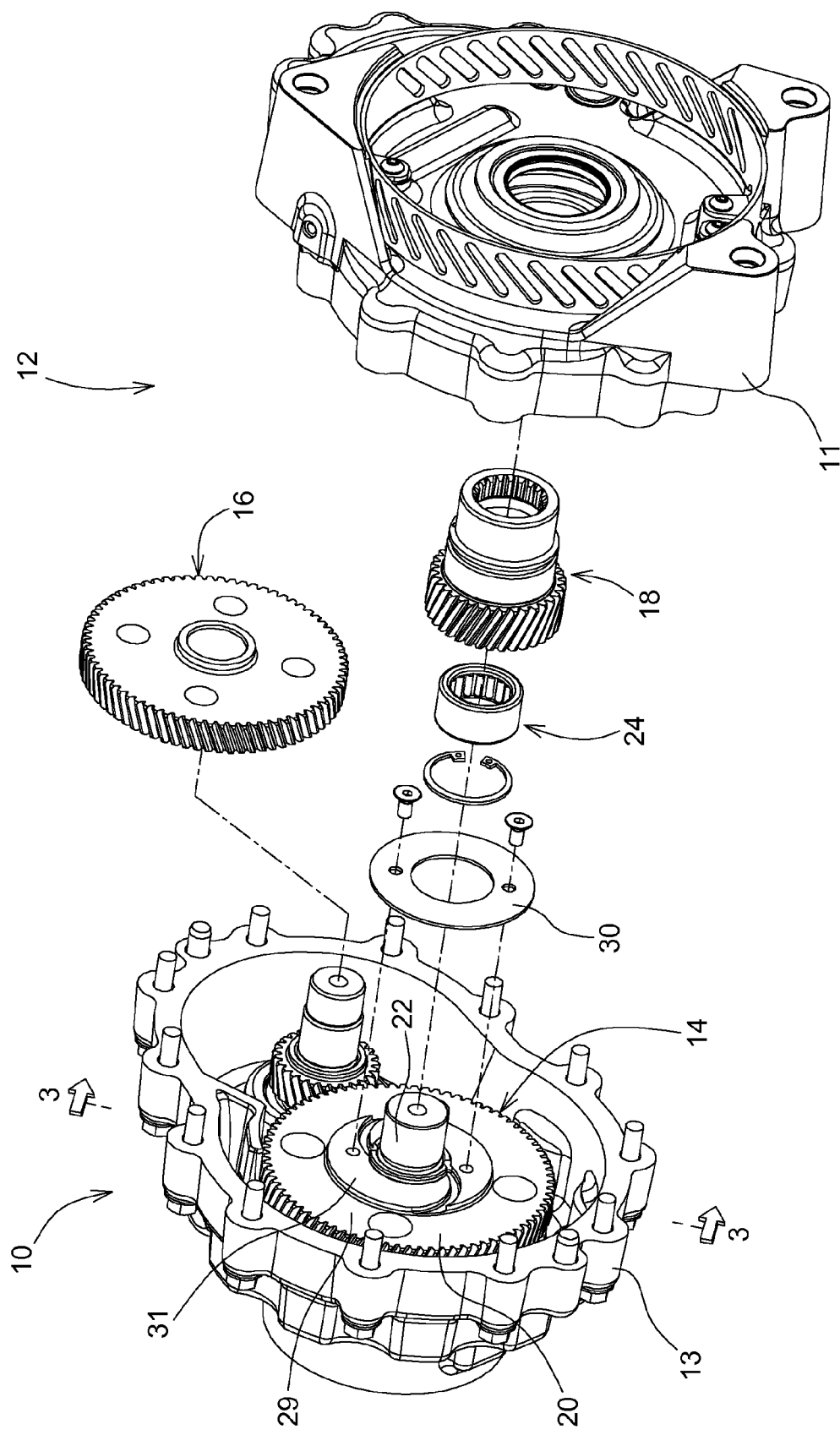
FIG. 1 is an exploded perspective view of a gearbox which embodies the present invention.
Figure 2:
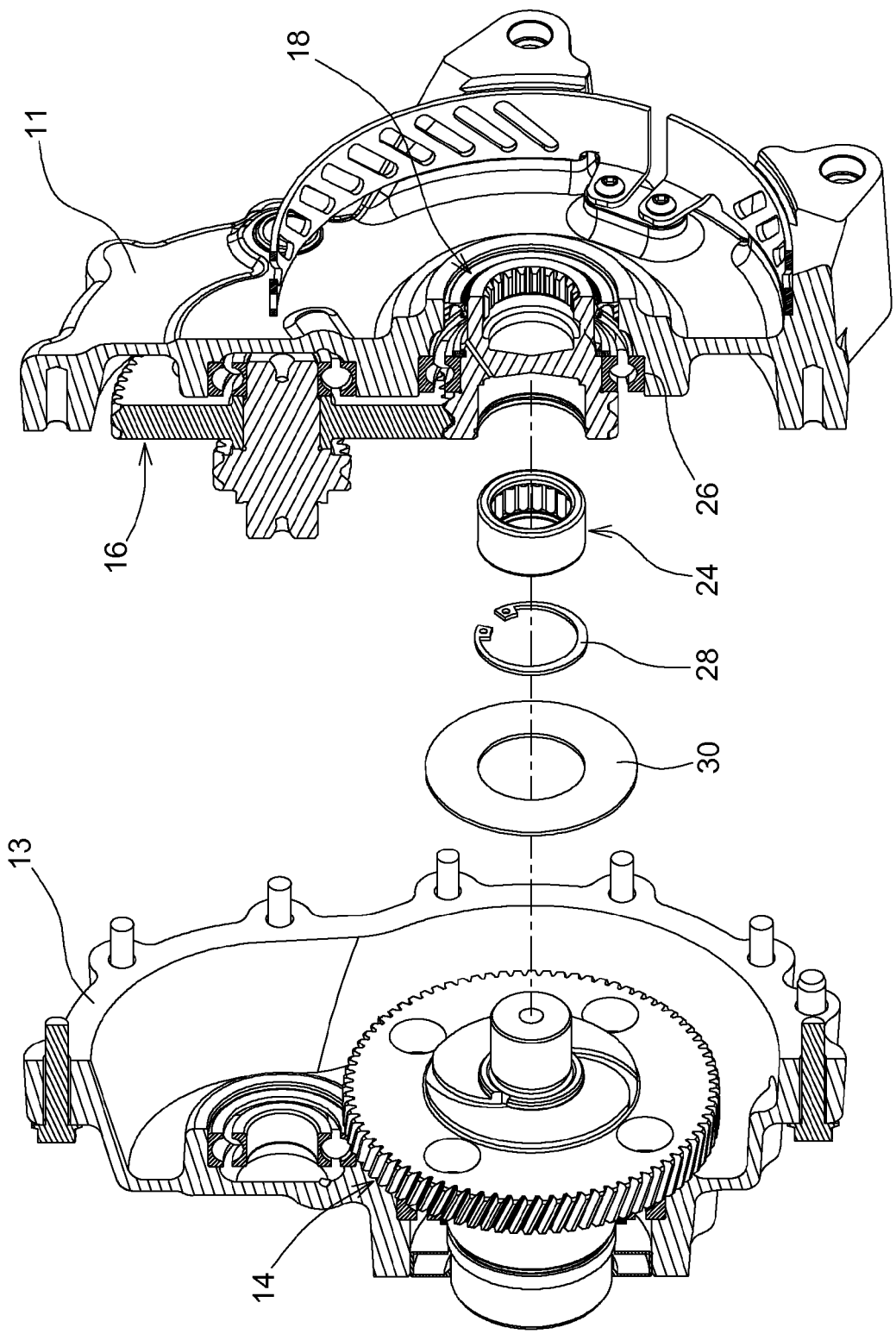
FIG. 2 is an exploded sectional perspective view of a gearbox which embodies the present invention.
Figure 3:
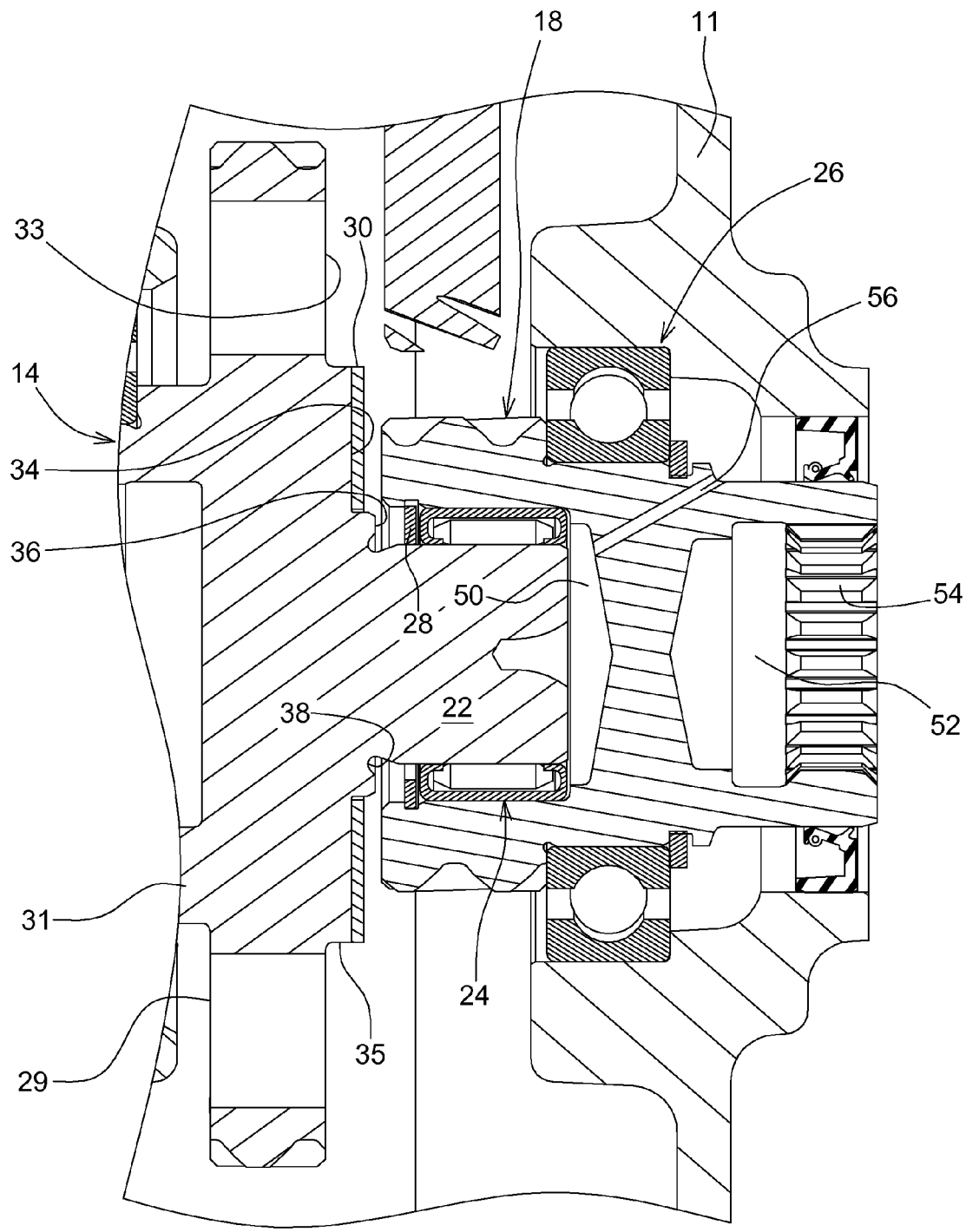
FIG. 3 is a sectional view along lines 3-3 of FIG. 1.

Referring to FIGS. 1, 2 and 3, a rotary machine such as a gearbox 10, such as for a power take off (PTO), includes an outer housing 12 which includes bolted together housing parts 11 and 13. Housing 12 surrounds rotating parts including an input gear 14. Input gear drives a drive gear 16, which, in turn drives an output gear 18 at a high speed, such as 1000 rpm. Input gear 14 includes a larger diameter flange 20 and a smaller diameter hub 22. A hollow needle bearing 24 is mounted on the hub 22, and the bearing 24 rotationally supports the output gear 18. As best seen in FIGS. 2 and 3, a conventional ball bearing 26 supports the output gear 18 for rotation in the housing part 11. A snap ring 28 retains the needle bearing 24 in position inside the output gear 18. An annular washer 30 is mounted next to the input gear 14. With respect to FIGS. 1, 2 and 4, the input gear 14 rotates in a clockwise direction.

Figure 4:
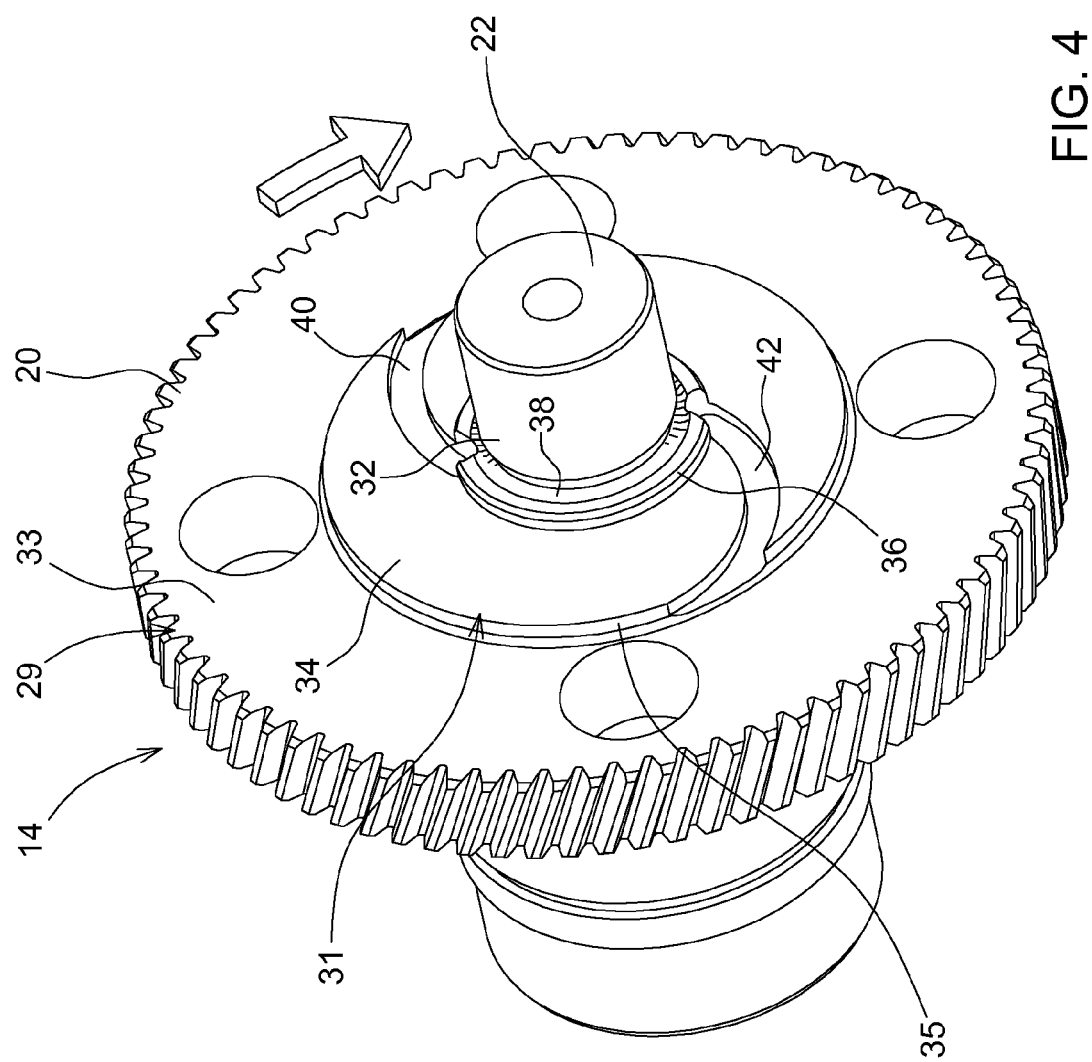
FIG. 4 is a perspective view of the input gear of the gearbox of FIG. 1.

Referring to FIGS. 3 and 4, the flange 20 of the input gear 14 has a larger diameter axially thinner flange portion 29 and a smaller diameter axially thicker flange portion 31. Flange portion 29 forms a radially outer annular axially facing surface 33. Flange portion 31 forms a radially inner annular facing surface 34. Inner surface 34 is positioned radially inwardly from outer surface 33. Inner surface 34 is spaced axially apart from outer surface 33 in a direction towards output gear 18. The washer 30 engages and covers surface 34 of thicker flange portion 31.

A radially outwardly facing peripheral wall or annular surface 35 extends between surfaces 34 and 33, and surrounds the smaller diameter flange portion 31. An inner portion of smaller diameter flange portion 31 forms an annular rim 36 which projects generally axially from surface 34. An annular channel 38 is formed between the rim 36 and an axially inner end 32 of the hub 22. Annular peripheral surface 35 has a diameter which is larger than a diameter of the hub 22.

A plurality (preferably two) milled slots or grooves 40 and 42 extend radially inwardly from the wall 35, through smaller diameter flange portion 31 through the rim 36 and to the channel 38. The slots 40 and 42 may be curved or spiral shaped. Thus, the grooves 40 and 42 communicate the outer edge of smaller diameter flange portion 31 with the outer surface of hub 22. The outer ends of the grooves 40 and 42 are forward of their inner ends with respect to the direction of rotation of the input gear 14. Thus the slots 40 and 42 in the side of the input gear 14 scoop sump oil and direct it inwardly through the slots 40 and 42 towards the needle bearing 24.

Referring again to FIG. 3, the output gear 18 forms an inner cavity 50 which receives the hub 22 and the needle bearing 24. The output gear 18 also forms an outer cavity 52 which has inner splines 54 and is adapted to receive a PTO shaft (not shown). The output gear 18 also includes a passage 56 which communicates the inner cavity 50 to an outer peripheral surface of the output gear adjacent to the bearing 26.

The passage 56 in the output gear 18, which rotates at 6000 rpm, creates an under-pressure that helps pull oil through the needle bearing 24 and communicate oil to the ball bearing 26. Because of the differential in speed between the input gear 14 and the output gear 18, the passage 56 in output gear 18 will create more of an under-pressure than the slots 40 and 42 in the slower rotating (1000 rpm) input gear 14.

Thus, as the input gear 14 rotates, the spiral grooves 40 and 42 scoop lubrication oil from the interior of the housing 12 and impel this oil radially inwardly through the rim 36 into the outer surface of the hub 22. A pressure differential pulls this oil through the needle bearing 24, then through the passage 56 and through the bearing 26. The result is a system which uses the rotation of the gears to create a pressure differential which sends lubricating sump oil to a buried needle bearing and ball bearing. Without these features, sump oil would normally be thrown outwardly and away from the centrally located bearings 24 and 26.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A rotary machine lubrication assembly, comprising:
   a housing enclosing a volume which contains oil;
   a first gear mounted for rotation in the housing, the first gear having an integral, axially projecting first central hub and a flange which projects radially outwardly from the first central hub, the flange includes a radially outwardly facing peripheral wall spaced radially outwardly from the hub;
   an annular first bearing is mounted on the first central hub;
   a second gear having an integral second central hub mounted on the first bearing for rotation in the housing;
   a first passage formed in an axial facing surface of the flange of the first gear, the first passage extending radially inwardly from the wall to the first central hub and having a radially outward first end located at the peripheral wall and a radially inward second end located at the first central hub, the first passage directing oil from the volume to a peripheral surface of the hub and to the bearing upon rotation of the first gear;
   the flange includes a larger diameter flange portion and a smaller diameter flange portion, the smaller diameter flange portion being axially thicker than said larger diameter flange portion thus forming the radially outwardly facing peripheral wall, the first gear also including an annular rim which surrounds the first central hub;
   an annular channel is formed between the rim and the first central hub;
   the first passage comprises a slot which extends through the smaller diameter flange portion and through the rim, and fluidly communicates the peripheral wall with the channel and the peripheral surface of the first central hub; and
   an annular washer engages and covers an annular surface of the smaller diameter flange portion, the annular washer extending radially between the rim and the peripheral wall and covering the slot.

2. The rotary machine lubrication assembly of claim 1, further comprising:
   an annular second bearing received on said second central hub and rotatably supporting the second gear with respect to the housing; and
   a second passage in the second central hub, the second passage communicating oil from the annular first bearing to the annular second bearing.

3. The rotary machine lubrication assembly of claim 2, wherein:
   the second gear includes an annular sleeve joined to a first end of the second central hub and which surrounds a cylindrical cavity in which the first central hub is received, the first central hub being sized such that an annular space is located between the first central hub and the sleeve which receives the first bearing; and
   the second passage extends axially and radially outwardly from the cavity to an outer surface of the second central hub.

4. The rotary machine lubrication assembly of claim 1, wherein:
   the radially outward end of the first passage is forward of the radially inward end of the first passage with respect to a rotation direction of the first gear.

5. A rotary machine lubrication assembly, comprising:
   a housing enclosing a volume which contains oil;
   a first gear mounted for rotation in the housing, the first gear having an integral, axially extending first central hub and a flange which projects radially outwardly from the first central hub, the flange having a radially outwardly facing peripheral wall;
   a second gear mounted for rotation in the housing, the second gear having a sleeve joined to an integral, axially extending second central hub, the sleeve receiving a portion of the first central hub;
   a first annular bearing being mounted on the first central hub and being received by the sleeve;
   a second bearing being received for rotating on the second central hub and supporting the second gear with respect to the housing;
   a first passage formed in an axial facing surface of the flange of the first gear, the first passage extending radially inwardly from the peripheral wall to the first central hub, the first passage directing oil from the volume to a peripheral surface of the first central hub and to the first annular bearing upon rotation of the first gear;
   a second passage in the second central hub of the second gear, the second passage having opposite ends respectively in fluid communication with the first annular bearing and the second bearing and being disposed for communicating oil from the first annular bearing to the second bearing;
   the flange includes a larger diameter axially thinner flange portion and a smaller diameter axially thicker flange portion, the smaller diameter flange portion being surrounded by the peripheral wall;
   the first passage comprises a slot formed in an axially facing surface of the smaller diameter flange portion;
   the first gear includes an annular rim which surrounds the first central hub;
   an annular channel is formed between the rim and the first central hub;
   the slot extends through the smaller diameter flange portion and through the rim, and fluidly communicates the peripheral wall with the channel and with the peripheral surface of the first central hub; and
   an annular washer engages and covers the axially facing surface of the smaller diameter flange portion, the annular washer extending radially between the rim and the outwardly facing peripheral wall and covering the slot.

6. The rotary machine lubrication assembly of claim 5, wherein:
   a radially outward end of the first passage is forward of a radially inward end of the first passage with respect to a rotation direction of the first gear.

7. A rotary machine lubrication assembly, comprising:
a housing enclosing a volume which contains lubricating fluid;
a gear mounted for rotation in the housing, the gear having an integral central hub and a flange which projects radially outwardly from the central hub, a portion of the flange forming a radially outwardly facing annular peripheral wall having a diameter which is larger than a diameter of the central hub;
an annular bearing being mounted on the central hub;
a passage being formed in an axial facing surface of the flange of the gear, the passage extending radially inwardly from the peripheral wall to an outer surface of the central hub, the passage directing lubricating fluid from the volume to the outer surface of the central hub and to the annular bearing upon rotation of the gear;
the flange includes a larger diameter flange portion and a smaller diameter flange portion, the smaller diameter flange portion being axially thicker than said larger diameter flange portion thus forming the radially outwardly facing peripheral wall, the gear also including an annular rim which surrounds the central hub;
an annular channel is formed between the rim and the central hub;
the passage comprises a slot which extends through the smaller diameter flange portion and through the rim, and fluidly communicates the peripheral wall with the channel and the peripheral surface of the central hub; and
an annular washer engages and covers an annular surface of the smaller diameter flange portion, the annular washer extending radially between the rim and the outwardly facing peripheral wall and covering the slot.

8. The rotary machine lubrication assembly of claim 7, wherein:
a radially outward end of the first passage is forward of a radially inward end of the first passage with respect to a rotation direction of the gear.

\* \* \* \* \*